United States Patent
Jones et al.

(10) Patent No.: US 7,284,071 B2
(45) Date of Patent: Oct. 16, 2007

(54) WAKING A LINK LAYER BASED ON DATA CONTAINED IN A NETWORK PACKET

(75) Inventors: Walt G. Jones, Redmond, WA (US); Stephen B. Powers, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 846 days.

(21) Appl. No.: 10/628,283

(22) Filed: Jul. 28, 2003

(65) Prior Publication Data

US 2005/0025067 A1 Feb. 3, 2005

(51) Int. Cl.
*G06F 15/173* (2006.01)

(52) U.S. Cl. .................................................... 709/250

(58) Field of Classification Search ................. 709/250
See application file for complete search history.

(56) References Cited

U.S. PATENT DOCUMENTS 6,694,440 B1 * 2/2004 Ishibashi .................... 713/310
7,058,825 B2 * 6/2006 Kobayashi ................... 713/300

* cited by examiner

Primary Examiner—David Y. Eng
(74) Attorney, Agent, or Firm—Workman Nydegger

(57) ABSTRACT

The present invention extends to methods, systems, and computer program product for waking a link layer based on data included in a network packet. A sending computer system and a receiving computer system are connected to a common network, such as, for example, an IEEE 1394 network. A physical layer at the receiving computer system receives a network packet from the sending computer system. The physical layer parses a plurality of bytes of packet data contained in the received network packet. The receiving computer system compares at least a portion of the packet data to rule data in a physical layer rule register. Based on the results of the comparison, it is determined if the physical layer is to assert a link on signal that, when received at a corresponding link layer, wakes the corresponding link layer.

26 Claims, 3 Drawing Sheets

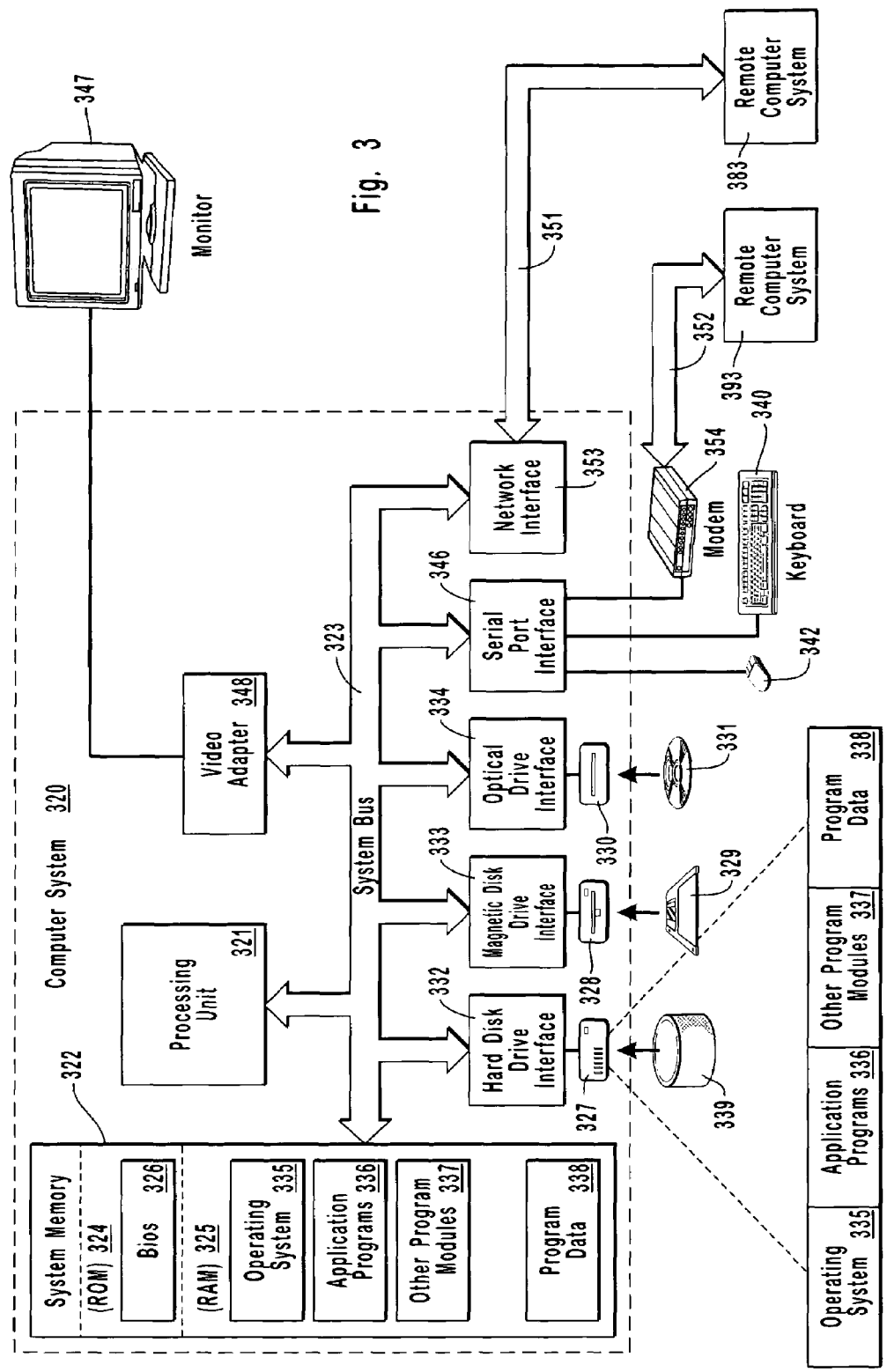

WAKING A LINK LAYER BASED ON DATA CONTAINED IN A NETWORK PACKET

BACKGROUND OF THE INVENTION

1. The Field of the Invention

The present invention relates to network communication technology, and more specifically, to mechanisms for waking a link layer based on data contained in a network packet.

2. Background and Relevant Art

Computer systems and related technology, such as, for example, consumer electronic devices, affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, web browsing) include electronic communication with one or more other computer systems or other electronic devices via wired and/or wireless computer networks.

When computer systems communicate electronically, electronic data will often pass through a protocol stack that performs operations on the electronic data (e.g., packetizing, routing, flow control). The Open System Interconnect ("OSI") model is an example of a networking framework for implementing a protocol stack. The OSI model breaks down the operations for transferring electronic data into seven distinct "layers," each designated to perform certain operations in the data transfer process. While protocol stacks can potentially implement each of the layers, many protocol stacks implement only selective layers for use in transferring electronic data across a network.

When data is received from a network it enters the physical layer and is passed up to higher intermediate layers and then eventually received at an application layer. The physical layer, the lower most layer, is responsible for converting electrical impulses, light, or radio waves into a bit stream and vice versa. On the other hand, when data is transmitted from a computing system, it originates at the application layer and is passed down to intermediate lower layers and then onto a network. The application layer, the upper most layer, is responsible for supporting applications and end-user processes, such as, for example, electronic conferencing software, electronic mail clients, web browsers, etc.

An intermediate layer incorporated by most protocol stacks is the Link layer. The Link layer is typically a layer that is situated immediately above the physical layer in a protocol stack. The Link layer decodes data packets (received from higher layers) into bit streams for use by the physical layer and encodes bit streams (received from the physical layer) into data packets for use by higher layers. One particular standard for implementing a physical layer and corresponding link layer is the Institute of Electrical and Electronics Engineers ("IEEE") 1394 external bus standard (often referred to as "FireWire"). IEEE 1394 can be used to couple consumer electronic devices, such as, for example, digital video camera, set-top boxes, etc., and computer systems (hereinafter collectively referred to as "1394 devices") to one another to facilitate the exchange of electronic data. Networks based on the IEEE 1394 standard have relatively high data transfer rates (up to 800 Megabits per second) and can deliver data isochronously. These characteristics make IEEE 1394 well suited for delivering real-time audio/video data that require synchronization between audio and video channels.

Many 1394 devices can also be configured to transition into a low power mode (or sleep mode) to conserve power resources. Transitioning into low power mode can occur after a specified time period of inactivity or as the result of receiving an appropriate command. When a 1394 device is operating in low power mode, the physical layer at the 1394 device may exchange timing data (e.g., electrical signaling) with physical layers at other 1394 devices connected to a common network. However, when operating in low power mode the link layer is essentially inactive and the physical layer does not exchange data with the link layer. When a packet is received, the 1394 device checks the packet to determine whether the packet is a physical layer packet (often referred to as a "PHY packet") or a primary packet (a packet containing data for upper layers of a corresponding protocol stack). However, aside from determining whether a packet is a PHY packet or a primary packet, the physical layer typically includes little, if any, ability to parse data contained in a received packet.

When the physical layer determines that a received packet is a primary packet, the packet is discarded. This conserves energy since the upper layers do not process data contained in the primary packet. Unfortunately, there is always some chance that a received primary packet contains data directed to the upper layers of the corresponding protocol stack. For example, a primary packet may contain data for a user-interface at a 1394 device that is operating in a low power mode. However, since the physical layer discards the primary packet, the upper layers never receive the data contained in the primary packet.

A 1394 device can transition out of a low power mode as a result of local input received at the 1394 device. For example, a user of a 1394 VCR device can operate the controls of the 1394 VCR device (e.g., pressing the play button) to transition the 1394 VCR device out of a low power mode. A 1394 device can also transition out of a low power mode in response to receiving a wake packet. A wake packet is a special PHY packet that indicates to the physical layer that the physical layer should activate the link layer. When the physical layer receives a wake packet, the physical layer wakes the link layer (e.g., asserting a LINK_ON signal to the link layer and a PME# signal to PCI Bus), from the low power state.

A device manager at one of the 1394 devices connected to a network can manage when wake packets are sent to other 1394 devices. For example, when a first 1394 device is to send a network packet to second 1394 device, the device manager sends a special wake packet to the second 1394 device to activate the link layer at the second 1394 device. When the network packet is received at the second 1394 device, the physical layer determines that the received network packet is a network packet and that the link layer is active. Accordingly, the physical layer transfers the data packet to the link layer. However, there is always some chance that a device manager will malfunction or will otherwise fail to appropriately supply a wake packet to a 1394 device operating in a low power mode. Accordingly, systems, methods, and computer program products for waking a link layer based on data contained in a primary packet would be advantageous.

BRIEF SUMMARY OF THE INVENTION

The foregoing problems with the prior state of the art are overcome by the principles of the present invention, which are directed towards, methods, systems, and computer program products for waking a link layer based on data contained in a network packet. A receiving computer system or receiving consumer electronics device (hereinafter collectively referred to as a "receiving computer system") and a sending computer system or sending consumer electronics device (hereinafter collectively referred to as a "sending computer system") are connected to a common network, such as, for example, an Institute of Electrical and Electronics Engineers ("IEEE") 1394 network. A physical layer at the receiving computer system receives a network packet from the sending computer system. The physical layer parses a plurality of bytes (e.g., in increments of four bytes or "quadlets") of packet data contained in the received network packet. For example, the physical layer can parse a portion of a received primary packet that includes a transaction code and/or a destination offset.

The receiving computer system compares at least a portion of the packet data to rule data in a physical layer rule register at the receiving computer system. In some embodiments, a bit mask (e.g., in a physical layer mask register) is applied to the packet data to mask the at least a portion of packet data that is to be compared to the rule data. An appropriate interface, such as, for example, an Open Host Controller Interface ("OHCI"), can be used to configure rule and mask registers.

The receiving computer system determines if the physical layer is to assert a link on signal based on the results of the comparison. For example, when results of the comparison indicate that the at least a portion of packet data matches the rule data, it is determined that the physical layer is to assert the link on signal. On the other hand, when the results of the comparison indicate that the at least a portion of packet data does not match the rule data, it is determined that the physical layer is not to assert the link on signal. Accordingly, a user or administrator can configure a IEEE 1394 physical layer to wake a corresponding IEEE 1394 link layer based on the contents of a received asynchronous, isochronous, or cycle start packet. Configuration can be performed at the receiving computer system or remotely from a computer system that is network connectable to the receiving computer system.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a suitable operating environment for the principles of the present invention.

DETAILED DESCRIPTION OF THE PREFERRED EMBODIMENTS

Figure 1:
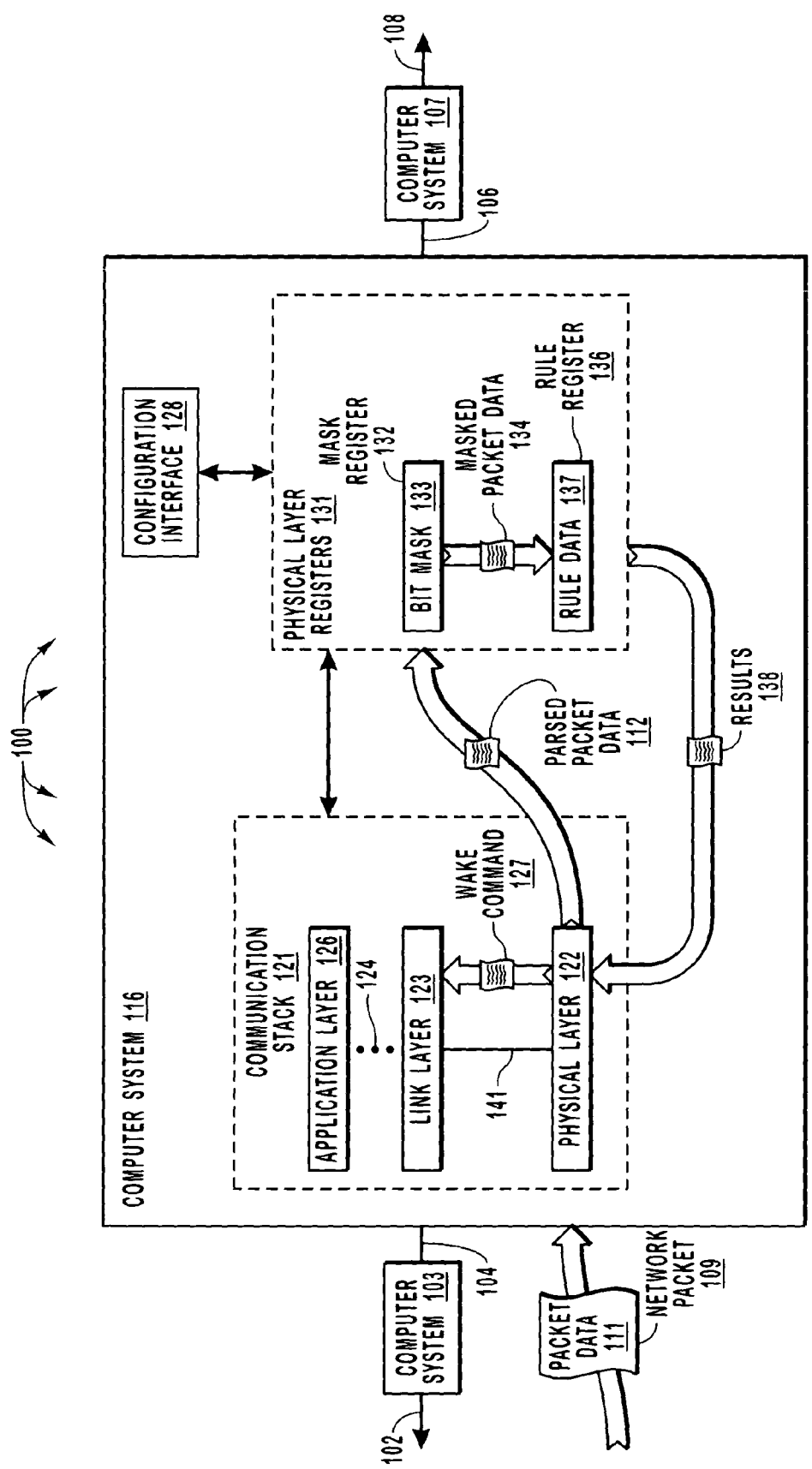
FIG. 1 illustrates an example of computer system architecture and associated modules and data structures for waking a link layer based on data included in a network packet in accordance with the principles of the present invention.

The present invention extends to methods, systems, and computer program products for waking a link layer based on data included in a network packet. A sending computer system or sending consumer electronics device and a receiving computer system or receiving consumer electronics device are connected to a common network, such as, for example, an Institute of Electrical and Electronics Engineers ("IEEE") 1394 network. A physical layer at the receiving computer system or receiving consumer electronics device receives a network packet from the sending computer system or sending consumer electronics device. The physical layer parses a plurality of bytes of packet data contained in the received network packet. The receiving computer system or receiving consumer electronics device compares at least a portion of the received packet data to rule data in a physical layer rule register. Based on the results of the comparison, it is determined if the physical layer is to assert a link on signal that, when received at a corresponding link layer, wakes the corresponding link layer.

Embodiments of the present invention may comprise a special purpose or general-purpose computer including various computer hardware and/or firmware and/or software, as discussed in greater detail below. In particular, embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other physical storage media, such as optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device, such as a GPU, to perform a certain function or group of functions.

Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (e.g., digital cameras, digital video recorders, and other consumer electronics devices) where internal modules (e.g., a memory and processor) work together to perform operations on electronic data.

Computer system is further defined to include electronic logic state machines. Electronic logic state machines can be implemented in integrated circuits embedded in pieces of semi conducting material (e.g., silicon), which may be referred to as "chips". Electronic logic state machines can be implemented, for example, utilizing very large-scale integration ("VLSI") and/or application specific integrated circuits ("ASICs"). A chip including a processor and corresponding instruction set can be viewed as an electronic logic state machine.

Those skilled in the art will appreciate that the invention may be practiced with many types of computer system configurations, including, personal computers, laptop computers, consumer electronic devices, multi-processor systems, minicomputers, mainframe computers, and the like. The invention may also be practiced in distributed system environments where local and remote computer systems, which are linked (either by hardwired links, wireless links, or by a combination of hardwired and wireless links) through a network, both perform tasks. In a distributed system environment, program modules and associated data structures may be located in both local and remote memory storage devices.

In this description and the following claims, a "communications stack" is defined as a plurality of communication layers, including at least physical layer and a corresponding link layer, that interoperate to transfer data between computer systems. Communication stack is defined to include protocol stacks based around the Open Systems Interconnection ("OSI") networking framework for implementing protocols, including protocol stacks that incorporate the functionality of a plurality of OSI layers in a single layer.

In this description and in the following claims, a "PHY layer packet" is defined as a network packet containing packet data that facilitates appropriate signaling (electrical, timing, etc.) between physical layers at computer systems.

In this description and in the following claims, a "primary packet" is defined as a network packet containing packet data that is to be processed at a communication layer above the physical layer. A primary packet can include packet configuration information, such as, for example, a transaction code or destination offset, that indicates how packet data contained in the primary packet is to be processed.

Turning now to FIG. 1, FIG. 1 illustrates an example of a computer system architecture 100 and associated modules and data structures waking a link layer based on data contained in a network packet. The rectangular elements in computer architecture 100 (e.g., physical layer 122, link layer 123, and configuration interface 128) represent executable modules that facilitate waking a link layer (e.g., link layer 123) based on data contained in a network packet. The scrolled elements (e.g., primary packet 109, packet data 112, and results 138) represent data that is processed by the executable modules to wake a link layer based on data contained in a network packet. Accordingly, the executable modules and scrolled elements depicted in computer architecture 100 cooperatively interact to implement the principles of the present invention.

Within computer system architecture 100, computer system 116 is connected to computer system 103 and computer system 107 by corresponding links 104 and 106 respectively. Each of computer systems 116, 103, and 107 can be a consumer electronics device or an electronic logic state machine. Arrows 102 and 108 illustrate that computer system 103 and computer system 107 can each be connected to additional other computer systems (not shown). Accordingly, it may be that computer systems 103, 107 and 116 are connected to a common network along with one or more additional other computer systems. Links 104 and 106 (as well as links to other additional computer systems) can be a portion of a system bus, a portion of a local area network ("LAN"), and/or a portion of a Wide Area Network ("WAN"). In some embodiments, links connecting the computer systems depicted in computer system architecture 100 are links of an Electrical and Electronics Engineers ("IEEE") 1394 network (which hereinafter may be referred to as an "IEEE 1394 network").

Computer system 116 includes communication stack 121 that facilitates the compatible exchange of data with other computer systems connected to a common network with computer system 116. Physical layer 122 can convert electrical impulses (or, when appropriate, light or radio signals) into a bit stream for transfer to link layer 123. Physical layer 122 can also convert a bit stream received from link layer 123 into electrical impulses (or, when appropriate, light or radio signals) for transfer to another computer system. Physical layer 122 is connected to link layer 123 by link 141. When appropriate, physical layer 122 can assert a Link On signal onto link 141 to cause link layer 123 to transition out of a reduced power mode.

Link layer 123 can parse data received from physical layer 122 to determine how packet data is to be processed. For example, based on a destination offset and/or transaction code, link layer 123 can determine if packet data is directed to an application at computer system 116. Link layer 123 can code a bit stream for use at layers above link layer 123 (e.g., application layer 126). Link layer 123 can also decode data from layers above link layer 123 for use at physical layer 122. Vertical ellipses 124 represents that other layers (e.g., a network and transport layer) can be included in communication stack 121. Application layer 126 interfaces with applications at computer system 116 to facilitate the transfer of data between applications (e.g., a streaming audio/video application) and communication stack 121.

Computer system 116 can receive network packets from and send network packets to other computer systems connected to a common network. For example, computer system 116 can receive network packet 109 from a computer system connected to a common IEEE 1394 network. It may be that network packet 109 is a PHY layer packet that facilitates appropriate signaling between computer system 116 and other computer systems (e.g., computer systems 103 and 107). Accordingly, physical layer 122 can receive and process network packet 109 such that appropriate signaling is maintained with the other computer systems.

However, it may also be that network packet 109 is a primary packet including packet data that is to be processed at layers above physical layer 122. In response to receiving a primary packet, physical layer 122 can determine if link layer 123 is in a reduced power mode. When link layer 123 is not in a reduced power mode, physical layer 122 can transfer packet data 111 to link layer 123. When link layer 123 is in a reduced power mode, such as, for example, a sleep mode, physical layer 122 can determine, based at least on a portion of packet data 111, if link layer 123 is to be transitioned out of the reduced power mode. Physical layer 122 can assert a Link On signal when it is determined that link layer 123 is to transition out of a reduced power mode.

Configuration interface 128, for example, an Open Host Controller Interface ("OHCI"), can be used to configure registers utilized by physical layer 122 and link layer 123. For example, configuration interface 128 can be used to configure physical layer registers 131. Mask register 132 can store bit mask 133 that is utilized to mask portions of packet data parsed from a network packet. Rule register 136 can store rule data (e.g., rule data 137) that is utilized to compare to packet data (e.g., masked packet data) to determine if packet data satisfies one or more rules. Physical layer registers 131 can be configured locally at computer system 116. Alternately, physical layer registers 131 can be configured remotely at other computer systems connected to a common network with computer system 116 by sending appropriate commands over the common network to computer system 116.

Figure 2:
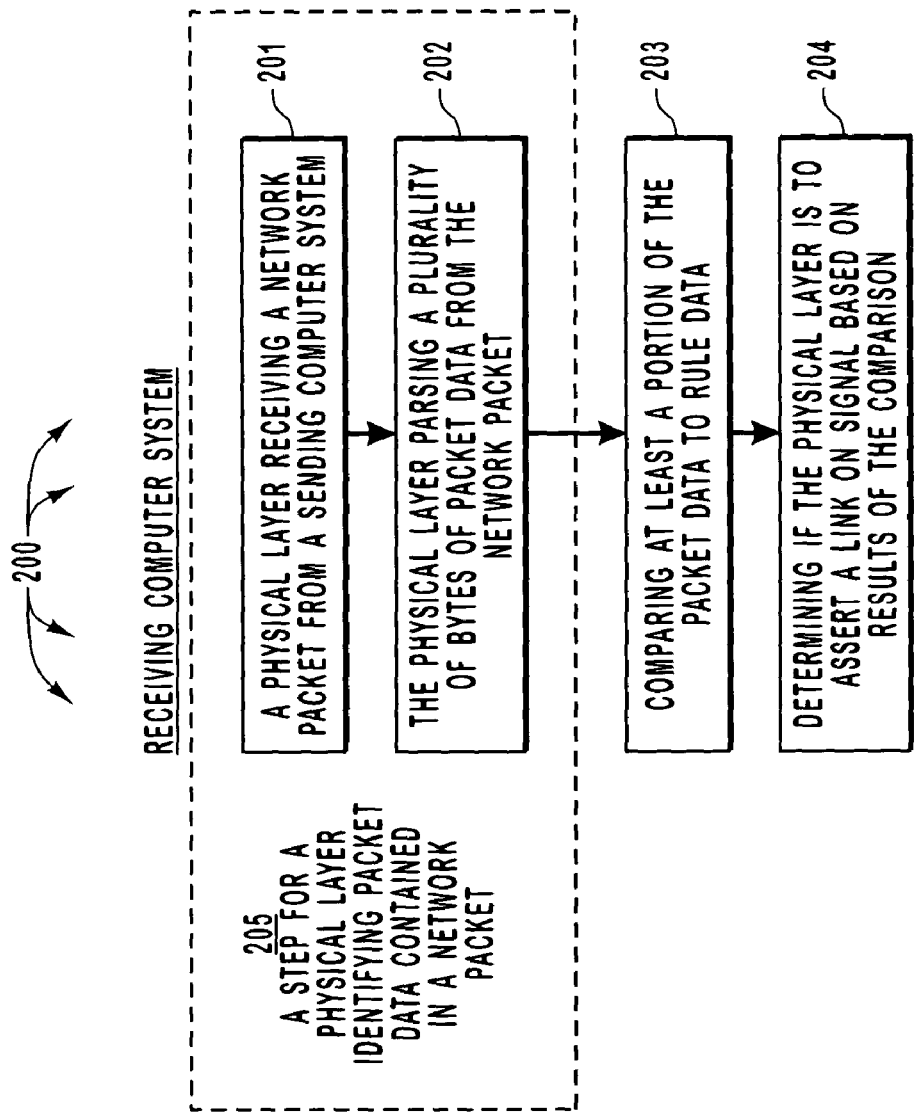
FIG. 2 illustrates a flowchart of an example method for waking a link layer based on data included in a network packet in accordance with the principles of the present invention.

FIG. 2 illustrates a flowchart of an example method 200 for waking a link layer based on data contained in a network data packet. The method 200 will be discussed with respect to the executable modules and data structures depicted in computer system architecture 100. The method 200 includes a functional result oriented step for a physical layer identifying packet data contained in a network packet (step 205). Step 205 can include any corresponding acts for a physical layer identifying packet data contained in a network packet.

However, in the method illustrated in FIG. 2, step 205 includes a corresponding act of a physical layer receiving a network packet from a sending computer system (act 201). Act 201 can include a physical layer at a receiving computer system receiving a network packet from a sending computer system. For example, physical layer 122 can receive network packet 109 that was sent from another computer system connected to a common network with computer system 116. Network packet 109 can be a PHY layer packet or a primary packet and can be associated with an IEEE 1394 network.

Step 205 includes a corresponding act of the physical layer parsing a plurality of bytes of packet data from the network packet (act 202). Act 202 can include a physical layer at a receiving computer system parsing a plurality of bytes of packet data from the network packet. For example, physical layer 122 can parse a plurality of bytes of packet data 111. It may that physical layer 122 parses one or more quadlets (i.e., groupings of four bytes) of packet data 111.

The number of parsed quadlets can be configured based on the desires of a user or administrator or even a manufacturer at the time a computer system (e.g., a digital video camera) is manufactured. When it is advantageous to obtain more information associated with a network packet, the number of quadlets parsed at the physical layer can be increased. For example, when network packet 109 is a primary packet associated with an IEEE 1394 network, parsing three quadlets (twelve bytes) of network packet 109 can provide physical layer 122 with additional address offset information. On the other hand, when it is advantageous to conserve resources of the physical layer, the number of quadlets parsed at the physical layer can be decreased.

It may be that computer system 116 is configured to wake link layer 123 based on specified transaction codes included in network packets. Accordingly, when network packet 109 is a primary packet associated with an IEEE 1394 network, parsing two quadlets (eight bytes) of network packet 109 can provide physical layer 122 with appropriate transaction code information. Physical layer 122 can transfer parsed packet data, such as, for example, parsed packet data 112, to physical layer registers 131. Parsed packet data 112 can be one or more quadlets of packet data parsed from packet data 111.

Method 200 includes an act of comparing at least a portion of the packet data to rule data (act 203). Act 203 can include a receiving computer system comparing at least a portion of the packet data to rule data. For example, computer system 116 can compare a parsed packet data 112 to rule data 137. A bit mask stored in mask register 132 can be applied to parsed packet data 112 to mask specified portions of parsed packet data 112. For example, bit mask 133 can be applied to parsed packet data 112 to mask specified portions of parsed packet data 112 that are of interest.

Resulting masked packet data can be compared to rule data stored in rule register 136. For example, masked packet data 134 can be compared to rule data 137. Results of the comparison of masked packet data to rule data can be generated. For example, comparing masked packet data 134 to rule data 137 generates results 138. Results of the comparison of mask packet data and rule data can be returned to the appropriate physical layer. For example, results 138 can be returned to physical layer 122.

Method 200 includes an act of determining if the physical layer is to assert a Link On signal based on results of the comparison (act 204). Act 204 can include a receiving computer system determining if a corresponding physical layer is to assert a Link On signal based on results of the comparison. For example, computer system 116 can determine if physical layer 122 is to assert a Link On signal onto link 141 based on results 138. When results 138 indicate that masked packet data 134 does not satisfy rule data 137 (e.g., masked packet data 134 and rule data 137 do not match), computer system 116 determines that physical layer 122 is not to assert a Link On signal. On the other hand, when results 138 indicate that masked packet data 134 satisfies rule data 137 (e.g., masked packet data 134 and rule data 137 match), computer system 116 can determine that physical layer 122 is to assert a Link On signal.

In response to a determination that physical layer 122 is to assert a Link On signal, physical layer 122 can assert a Link On signal onto link 141. For example, physical layer 122 can send wake command 127 to link layer 123. In response to a Link On signal received on link 141, link layer 123 can transition out of a reduced power mode. For example, in response to wake command 127, link layer 123 can transition out of a reduced power mode. When appropriate, physical layer 122 then transfers packet data 111 to link layer 123. Accordingly, embodiments of the present invention can cause a link layer to transition out of a reduced power mode in response to a corresponding physical layer receiving packet data that is to be delivered to the link layer.

FIG. 3 illustrates a suitable operating environment for the principles of the present invention. FIG. 3 and the following discussion are intended to provide a brief, general description of a suitable computing environment in which the invention may be implemented. With reference to FIG. 3, an example system for implementing the invention includes a general-purpose computing device in the form of computer system 320.

Computer system 320 includes a processing unit 321, a system memory 322, and a system bus 323 that couples various system components including the system memory 322 to the processing unit 321. Processing unit 321 can execute computer-executable instructions designed to implement features of computer system 320, including features of the present invention. The system bus 323 may be any of several types of bus structures including a memory bus or memory controller, a peripheral bus, and a local bus using any of a variety of bus architectures. The system memory includes read only memory ("ROM") 324 and random access memory ("RAM") 325. A basic input/output system ("BIOS") 326, containing the basic routines that help transfer information between elements within the computer 320, such as during start-up, may be stored in ROM 324.

The computer system 320 may also include a magnetic hard disk drive 327 for reading from and writing to a magnetic hard disk 339, a magnetic disk drive 328 for reading from or writing to a removable magnetic disk 329, and an optical disk drive 330 for reading from or writing to removable optical disk 331, such as, for example, a CD-ROM or other optical media. The magnetic hard disk drive 327, magnetic disk drive 328, and optical disk drive 330 are connected to the system bus 323 by hard disk drive interface 332, magnetic disk drive-interface 333, and optical drive interface 334, respectively. The drives and their associated computer-readable media provide nonvolatile storage of computer-executable instructions, data structures, program modules, and other data for computer system 320. Although the example environment described herein employs a magnetic hard disk 339, a removable magnetic disk 329 and a removable optical disk 331, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 339, magnetic disk 329, optical disk 331, ROM 324 or RAM 325, including an operating system 335, one or more application programs 336, other program modules 337, and program data 338. A user may enter commands and information into the computer system 320 through keyboard 340, pointing device 342, or other input devices (not shown), such as, for example, a microphone, joy stick, game pad, scanner, or the like. These and other input devices can be connected to the processing unit 321 through serial port interface 346 coupled to system bus 323. Alternatively, input devices can be connected by other interfaces, such as, for example, a parallel port, a game port, a universal serial bus ("USB") port, or a Fire Wire port. A monitor 347 or other display device is also connected to system bus 323 via video adapter 348. Computer system 320 can also be connected to other peripheral output devices (not shown), such as, for example, speakers and printers.

Computer system 320 is connectable to networks, such as, for example, an office-wide or enterprise-wide computer network, an intranet, and/or the Internet. Computer system 320 can exchange data with external sources, such as, for example, remote computer systems, remote applications, and/or remote databases over such a network.

Computer system 320 includes network interface 353, through which computer system 320 receives data from external sources and/or transmits data to external sources. As depicted in FIG. 3, network interface 353 facilitates the exchange of data with remote computer system 383 via link 351. Link 351 represents a portion of a network, and remote computer system 383 represents a node of the network.

Likewise, computer system 320 includes serial port interface 346, through which computer system 320 receives data from external sources and/or transmits data to external sources. Serial port interface 346 is coupled to modem 354, through which computer system 320 receives data from and/or transmits data to external sources. Alternately, modem 354 can be a Data Over Cable Service Interface Specification ("DOCSIS") modem or digital subscriber lines ("DSL") modem that is connected to computer system 320 through an appropriate interface. However, as depicted in FIG. 3, serial port interface 346 and modem 354 facilitate the exchange of data with remote computer system 393 via link 352. Link 352 represents a portion of a network, and remote computer system 393 represents a node of the network.

While FIG. 3 represents a suitable operating environment for the present invention, the principles of the present invention may be employed in any system that is capable of, with suitable modification if necessary, implementing the principles of the present invention. The environment illustrated in FIG. 3 is illustrative only and by no means represents even a small portion of the wide variety of environments in which the principles of the present invention may be implemented.

Modules of the present invention, as well as associated data, can be stored and accessed from any of the computer-readable media associated with computer system 320. For example, portions of such modules and portions of associated program data may be included in operating system 335, application programs 336, program modules 337 and/or program data 338, for storage in system memory 322. When a mass storage device, such as, for example, magnetic hard disk 339, is coupled to computer system 320, such modules and associated program data may also be stored in the mass storage device. In a networked environment, program modules and associated data depicted relative to computer system 320, or portions thereof, can be stored in remote memory storage devices, such as, for example, system memory and/or mass storage devices associated with remote computer system 383 and/or remote computer system 393. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a receiving computer system that is communicatively coupled to an IEEE 1394 network, a method for waking a link layer at the receiving computer system based on data included in a network data packet, the method comprising:

an act of a physical layer receiving a network data packet from a sending computer system, the sending computer system being communicatively coupled to the IEEE 1394 network;

an act of the physical layer parsing a plurality of bytes of packet data contained in the received network data packet;

an act of comparing at least a portion of the packet data to rule data in a physical layer rule register;

an act of determining whether a corresponding link layer is in a reduced power mode; and an act of determining if the physical layer is to assert a Link On signal based on the results of the comparison and upon determining that the corresponding link layer is in the reduced power mode, the Link On signal being a signal that, when received at the link layer, wakes the corresponding link layer.

2. The method as recited in claim 1, wherein the act of a physical layer receiving a network data packet comprises an act of the physical layer receiving a primary packet.

3. The method as recited in claim 1, wherein the act of a physical layer receiving a network data packet comprises an act of the physical layer receiving a PHY layer packet.

4. The method as recited in claim 1, wherein the act of the physical layer parsing a plurality of bytes of packet data contained in the received network data packet comprises an act of the physical layer parsing a plurality of bytes of packet data contained in a received primary packet.

5. The method as recited in claim 1, wherein the act of the physical layer parsing a plurality of bytes of packet data contained in the received network data packet comprises an act of the physical layer parsing a plurality of bytes of packet data contained in a received PHY layer packet.

6. The method as recited in claim 1, wherein the act of the physical layer parsing a plurality of bytes of packet data contained in the received network data packet comprises an act of the physical layer parsing a transaction code contained in the received network data packet.

7. The method as recited in claim 1, wherein the act of the physical layer parsing a plurality of bytes of packet data contained in the received network data packet comprises an act of the physical layer parsing an address offset contained in the received network data packet.

8. The method as recited in claim 1, further comprising:
an act of utilizing a configuration interface to configure the physical layer rule register.

9. The method as recited in claim 8, wherein the act of utilizing a configuration interface to configure the physical layer rules register comprises an act of utilizing an Open Host Controller Interface.

10. The method as recited in claim 1, wherein the act of comparing at least a portion of the packet data to rule data in a physical layer rule register comprises an act of applying a bit mask to a parsed plurality of bytes of packet data.

11. The method as recited in claim 10, wherein the act of applying a bit mask to a parsed plurality of bytes of packet data comprises an act of applying a bit mask stored in a physical layer mask register.

12. The method as recited in claim 11, further comprising:
an act of an act of utilizing a configuration interface to configure the physical layer mask register.

13. The method as recited in claim 12, wherein the act of utilizing a configuration interface to configure the physical layer mask register comprises an act of utilizing an Open Host Controller Interface.

14. The method as recited in claim 1, wherein the act of comparing at least a portion of the packet data to rule data in a physical layer rule register comprises an act of comparing a transaction code to rule data.

15. The method as recited in claim 1, wherein the act of comparing at least a portion of the packet data to rule data in a physical layer rule register comprises an act of comparing an address offset to rule data.

16. The method as recited in claim 1, wherein the act of determining if the physical layer is to assert a link on signal based on the results of the comparison comprises an act of determining that the physical layer is to assert a Link On signal.

17. The method as recited in claim 16, wherein the act of determining that the physical layer is to assert a Link On signal comprises an act of determining that the at least a portion of the packet data matches the rule data.

18. The method as recited in claim 16, further comprising:
an act of asserting a Link On signal.

19. The method as recited in claim 1, wherein the act of determining if the physical layer is to assert a Link On signal based on the results of the comparison comprises an act of determining that the physical layer is not to assert a Link On signal.

20. The method as recited in claim 19, wherein the act of determining that the physical layer is not to assert a Link On signal comprises an act of determining that the at least a portion of the packet data does not match the rule data.

21. The method as recited in claim 1, wherein the receiving computer system comprises a consumer electronics device.

22. The method as recited in claim 1, wherein the receiving computer system comprises an electronic logic state machine.

23. At a receiving computer system that is communicatively coupled to an IEEE 1394 network, a method for waking a link layer at the receiving computer system, the method comprising:

a step for a physical layer identifying packet data contained in a network data packet;

an act of comparing at least a portion of the packet data to rule data in a physical layer rule register;

an act of determining whether a link layer is in a reduced power mode; and an act of determining if the physical layer is to assert a Link On signal based on the results of the comparison and upon determining that the link layer is in the reduced power mode, the Link On signal being a signal that, when received at the link layer, wakes the link layer.

24. A computer-readable storage medium having computer-executable instructions for performing the method comprising:

an act of a physical layer receiving a network data packet from a sending computer system, the sending computer system being communicatively coupled to the IEEE 1394 network;

an act of the physical layer parsing a plurality of bytes of packet data contained in the received network data packet;

an act of comparing at least a portion of the packet data to rule data in a physical layer rule register;

an act of determining whether a corresponding link layer is in a reduced power mode; and an act of determining if the physical layer is to assert a Link On signal based on the results of the comparison and upon determining that the corresponding link lager is in the reduced power mode, the Link On signal being a signal that, when received at the link layer, wakes the corresponding link layer.

25. The computer-readable storage medium as recited in claim 24, wherein an act of the physical layer parsing a plurality of bytes of packet data contained in the received network data packet comprise an act of the physical layer at the receiving computer system parsing a plurality of bytes of packet data contained in a primary packet.

26. The computer-readable storage medium as recited in claim 24, further comprising:
an act of causing a physical layer at the receiving computer system to assert a Link On signal.

* * * * *